United States Patent [19]

Hähnke et al.

[11] Patent Number: 4,689,050
[45] Date of Patent: Aug. 25, 1987

[54] MIXTURES OF BLUE DISPERSE AZO DYESTUFFS FOR DYEING SYNTHETIC FIBERS

[75] Inventors: Manfred Hähnke, Kelkheim; Reinhard Kühn, Frankfurt am Main; Reinhard Hähnle, Königstein; Rudolf Schickfluss, Kelkheim, all of Fed. Rep. of Germany

[73] Assignee: Hoechst Aktiengesellschaft, Frankfurt am Main, Fed. Rep. of Germany

[21] Appl. No.: 811,379

[22] Filed: Dec. 20, 1985

Related U.S. Application Data

[63] Continuation of Ser. No. 686,723, Dec. 27, 1984, abandoned.

[30] Foreign Application Priority Data

Dec. 30, 1983 [DE] Fed. Rep. of Germany ....... 3347572

[51] Int. Cl.$^4$ ...................... C09B 29/08; C09B 67/22; D06P 1/18; D06P 3/54
[52] U.S. Cl. ............................................ 8/639; 8/638; 8/921; 8/922; 8/924
[58] Field of Search ............................................ 8/639

[56] References Cited

U.S. PATENT DOCUMENTS 4,105,655  8/1978  Gottschlich et al. ............... 534/852
4,212,642  7/1980  Della Casa et al. ..................... 8/470
4,237,048  12/1980  Gottschlich et al. ............... 534/732
4,386,934  6/1983  Bergmann et al. ..................... 8/639
4,401,692  8/1983  Schickfluss et al. .................... 8/471
4,422,854  12/1983  Hahnle et al. ........................... 8/471

FOREIGN PATENT DOCUMENTS 2601208  11/1976  Fed. Rep. of Germany .
1582743  1/1981  United Kingdom .

Primary Examiner—A. Lionel Clingman
Attorney, Agent, or Firm—Connolly and Hutz

[57] ABSTRACT

Disperse Blue 56 is an important blue dyestuff for dyeing PES fibers at the boil or under high-temperature conditions. This anthraquinonoid compound Disperse Blue 56, in addition to its advantages (high light fastness, pH/reduction insensitivity, purity of hue), has some technical disadvantages (poor leveling properties, pronounced staining of adjacent fiber, metameric red shift).

By combining a plurality of blue disperse azo dyestuffs having selected structural features in the form of mixtures or mix-crystals it is possible to match the advantages of Disperse Blue 56 while substantially avoiding its disadvantages at the same time. These azo dyestuffs are based on coupling products of diazotized 2,6-substituted 4-nitroanilines with substituted N,N-dialkylanilines.

17 Claims, No Drawings

MIXTURES OF BLUE DISPERSE AZO DYESTUFFS FOR DYEING SYNTHETIC FIBERS

CROSS-REFERENCE

This application is a continuation of application Ser. No. 686,723, filed Dec. 27, 1984 by Manfred Hahnke et al for Mixtures of Blue Disperse Azo Dyestuffs for Dyeing Synthetic Fibers, (now abandoned).

Synthetic fibers, such as polyester (PES), nylon or acetate fibers, as is known, can be exhaust-dyed with disperse dyestuffs by the high-temperature method (between 105° and 140° C., preferably at 130° C.) or at the boil (at 95° to 100° C. in the presence of carriers).

However, only a few selected disperse dyestuffs are suitable for producing all depths of shade in dyeing at the boil, which is usually carried out in open dyeing apparatus, under atmospheric pressure. Despite the presence of a carrier, many disperse dyestuffs produce only pale to medium depths of shade when applied by this method.

Within the blue region of dyeing PES fibers at the boil, the anthraquinonoid dye C.I. Disperse Blue 56 (C.I. No. 63,285) has become established in international practice as the most important blue dyestuff for self-shade and combination-shade dyeings. It has in fact already been proposed to mix this anthraquinone dyestuff with disperse blue dyestuffs of a different chemical structure (which may be less costly and tinctorially stronger) in such a way as to retain the high suitability for dyeing PES fibers at the boil to a sufficient degree.

Disperse Blue 56 leads to bright, reddish blue dyeings of high light fastness; and although this dyestuff, which is the standard product not only for dyeing PES fibers at the boil but also for dyeing them under high temperature conditions, is basically suitable for all depths of shade, it nonetheless has a number of disadvantages:

First of all the tinctorial strength which, as is typical of anthraquinonoid blue dyestuffs, is relatively low. As a consequence, this fact leads to high dyestuff demand and thus to considerable costs, in particular for producing dyeings of relatively high depth of shade.

Furthermore, the partition equilibrium at the end of the dyeing (i.e. the dyestuff level in the fiber relative to the dyestuff level in the liquor) is so unfavorable that, depending on the depth of shade of the dyeing, an appreciable amount of dyestuff will not exhaust onto the PES fiber.

Moreover, when dyeing mixtures of PES fibers and fibers of natural origin, such as wool or cotton, or with regenerated cellulose fibers, said adjacent fibers are badly stained. This staining of the adjacent fibers cannot be completely removed even with a reduction clear.

In the presence of certain metal ions (such as those responsible for water hardness, or of copper, iron and so on) in the dyebath, there is in turn the danger of dyestuff precipitation, so that it is frequently necessary to carry out the dyeing in the presence of complexing agents.

In dyeing wound packages (cheeses, muffs or beams), yarn in hank form, and piece goods in self-shades and in combination shades there is always a great danger, in particular under difficult machinery and textile material conditions and with the modern rapid-dyeing methods, that the dyeing will turn out unlevel. Disperse Blue 56, unless an excessively long dyeing time is employed for the subsequent leveling-out of the dyeing, is among the particularly poor-leveling disperse blue dyestuffs.

Finally, viewed in the light from incandescent lamps and fluorescent tubes, PES dyeings with Disperse Blue 56 show a marked shift in hue towards red compared with natural or artificial daylight. This pronounced dependence of the shade on the light source used has been accepted in the field in the past decade for lack of better alternatives. If, however, Disperse Blue 56 is to be replaced in an existing dyeing recipe by some other blue dyestuff, it is virtually impossible, for the above reason, to obtain a nonmetameric match with the target shade.

In the light of the previously discussed practical reservations, it is therefore the object of the present invention to remedy the abovementioned short comings of the anthraquinonoid dye Disperse Blue 56 when used for the exhaust-dyeing of synthetic fibers, in particular of PES fibers and mixtures thereof with other fibers, by developing—to replace said dyestuff—new combinations of blue dyestuffs known per se and at the same time to aim for a favorable cost/tinctorial strength relationship in respect of the replacement.

It is true that the prior art already describes blue azo compounds of the formula given below, as well as their use as individual dyestuffs for dyeing PES fibers (cf. German Auslegeschriften DE-B-1,290,915 and DE-B-1,544,563):

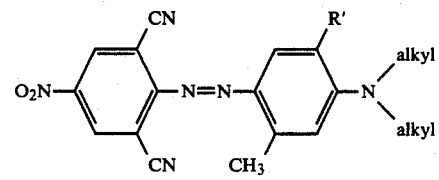

Disperse dyestuffs of this type are distinguished by considerable brightness of shade and by appreciable tinctorial strength. On the other hand, in the case of R'=H the result is again blue dyeings which, in incandescent lamp light, look still more reddish by an appreciable degree, and in the case of R'=alkoxy the result is dyeings which, in incandescent lamp light, appear noticeably greener. Moreover, for example, the dyestuffs of the abovementioned formula where alkyl=ethyl and where R=H or methoxy lead at best only to respectively medium and pale depth of shade when dyeing PES fibers at the boil, even in the presence of carriers. However, in this case, higher dyestuff levels than hitherto customary produce no further increase in the depth of shade but are left behind, unconsumed, in the dyebath.

Furthermore, it is similarly known to use blue disperse azo dyestuffs of the following formula

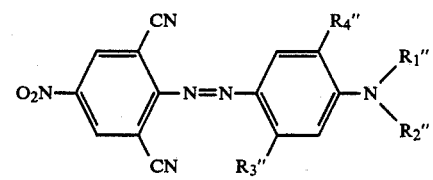

$R_1''=C_1-C_4$-alkyl
$R_2''=H$ or $R_1''$
$R_3''=CH_3$, $OCH_3$ or $OC_2H_5$
$R_4''=H$ or $R_3''$ for the heat transfer printing process (cf. German Offenlegungsschrift DE-A-3,121,981). However, this use in transfer printing has no bearing whatsoever on the use of these products in exhaust-dyeing.

It has now been found that the previously mentioned disadvantages of the known blue individual dyestuffs in the exhaust-dyeing of in particular PES fibers can be avoided by the controlled use of a combination of selected azo compounds of the abovementioned type, since experimental studies showed, surprisingly, that mixtures of two or three individual dyestuffs are synergistic in exhaustion only if certain structural features are present, while mixtures of different dyestuffs have exhaustion properties no better than that of the corresponding individual dyestuffs.

The present invention accordingly provides, primarily, dyestuff preparations in the form of mixtures or mix-crystals which contain (a) 20 to 90, preferably 30 to 80, in particular to 50 to 70, parts by weight of one or more blue disperse dyestuffs of the general formula I

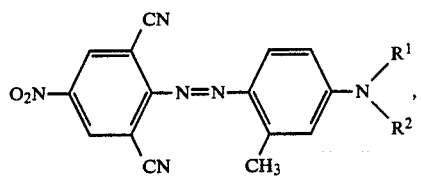

and 10 to 80, preferably 20 to 70, in particular 30 to 50, parts by weight of one or more blue disperse dyestuffs of the general formula II

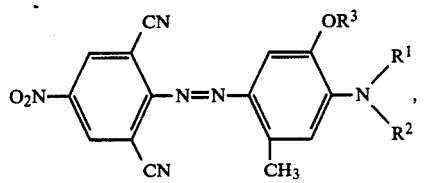

and 0 to 70, preferably 0 to 50, in particular 0 to 20, parts by weight of one or more blue disperse dyestuffs of the general formula III

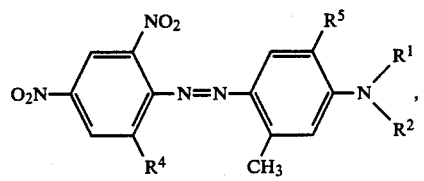

and 0 to 30, preferably 0 to 20, in particular 10 to 20, parts by weight of one or more blue disperse dyestuffs of the general formula IV

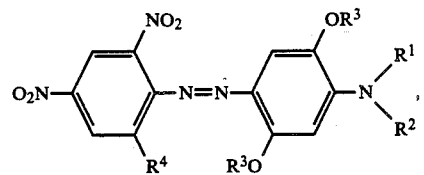

or (b) 20 to 90, preferably 30 to 80, parts by weight of one or more blue disperse dyestuffs of the general formula I or 10 to 80, preferably 20 to 70, parts by weight of one or more blue disperse dyestuffs of the general formula II and 10 to 90, preferably 20 to 80, parts by weight of one or more blue disperse dyestuffs of the general formula III and 0 to 30, preferably 0 to 20, parts by weight of one or more blue disperse dyestuffs of the general formula IV where, in the formulae I to IV, $R^1$ and $R^2$ = straight-chain or branched $(C_1-C_4)$-alkyl or $C_1-C_4$)-alkenyl, preferably methyl or ethyl, which can each be identical or or different, $R^3$ = methyl or ethyl, optionally interrupted in the carbon chain by ether oxygen, $R^4$ = chlorine or bromine and $R^5$ = hydrogen or an $OR^3$ radical and in which the ingredient amounts of the underlying individual dyestuffs are each expressed relative to a total weight of the preparation of 100 parts by weight of the dyestuffs of the formulae I to IV and (in the case of commercial products) relative to the pure dyestuff content.

Dyestuff preparations which have the features according to the invention and which are present as a mixture or mix-crystal (in the ready-to-use state) in the form of a fine dispersion resulting, for example, from grinding with dispersant(s) are highly suitable for the exhaust-dyeing of synthetic fibers (for example composed of nylon or acetate fibers, but in particular polyester fibers) by themselves or as components of mixtures of such synthetic fibers with natural fibers (such as wool or cotton) or regenerated fibers (chiefly regenerated cellulose) at the boiling point (95° C.–100° C.) of the aqueous dyeing medium or under high-temperature conditions (105° C.–140° C.) in the presence or absence of a customary carrier. They are used in the present invention as disperse blue dyestuff for obtaining, in particular, blue self-shade hues on synthetic fibers or the synthetic fiber component of fiber mixtures or also combination-shade hues in the presence of further disperse blue dyestuffs having a chemical structure other than that of the azo compounds of the formula I to IV, for example anthraquinonoid blue disperse dyestuffs, in the absence or presence of disperse dyestuff mixing components having a different structure which by themselves would produce shades other than blue. A dyeing process of the type mentioned and the use of the new dyestuff preparations on the basis mentioned are also part of the subject-matter of the present invention.

A particularly advantageously dyestuff preparation according to the invention comprises 50 to 70 parts by weight of a blue disperse dyestuff to the general formula V(=formula I, in which $R^1$ and $R^2=C_2H_5$) and 30 to 50 parts by weight of a blue disperse dyestuff of the general formula VI (=formula II in which $R^1$ and $R^2=C_2H_5$ and $R_3=CH_3$):

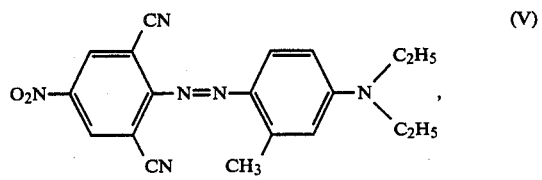

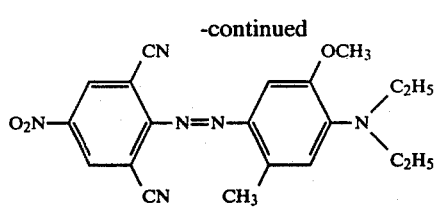

(VI)

According to the invention, useful properties are likewise possessed by a combination of 50 to 70 parts by weight of a blue disperse dyestuff of the general formula V, 30 to 50 parts by weight of a blue disperse dyestuff of the general formula VI and 10 to 20 parts by weight of a blue disperse dyestuff of the general formula VII (=formula IV in which $R^1$ and $R^2=C_2H_5$, $R^3=CH_3$, and $R^4$ is as defined above, namely=chlorine or bromine):

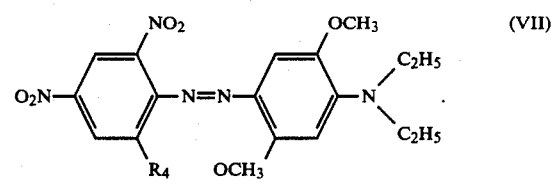

(VII)

Of the dyestuffs of the formula I, the dyestuffs of the following Table I are suitable for use as components of the mixture:

TABLE I (I)

$$O_2N-\text{[benzene with CN, CN]}-N=N-\text{[benzene with }CH_3]-N\begin{matrix}R^1\\R^2\end{matrix}$$

| $R^1$ | $R^2$ | $R^1$ | $R^2$ |
|---|---|---|---|
| —CH₃ | —CH₃ | | |
| —CH₃ | —C₂H₅ | —C₂H₅ | —C₂H₅ |
| —CH₃ | —CH₂CH₂CH₃ | —C₂H₅ | —CH₂CH₂CH₃ |
| —CH₃ | —CH(CH₃)₂ | —C₂H₅ | —CH(CH₃)₂ |
| —CH₃ | —CH₂—CH₂—CH₂—CH₃ | —C₂H₅ | —CH₂—CH₂—CH₂—CH₃ |
| —CH₃ | —CH(CH₃)(C₂H₅) | —C₂H₅ | —CH(CH₃)(C₂H₅) |
| —CH₃ | —CH₂—CH=CH₂ | —C₂H₅ | —CH₂—CH=CH₂ |
| —CH₃ | —CH(CH₃)—CH=CH₂ | —C₂H₅ | —CH(CH₃)—CH=CH₂ |
| —CH₃ | —CH₂—C(CH₃)=CH₂ | —C₂H₅ | —CH₂—C(CH₃)=CH₂ |
| —CH₃ | —CH₂—CH=CH—CH₃ | —C₂H₅ | —CH₂—CH=CH—CH₃ |
| —CH₂—CH₂—CH₃ | —CH₂—CH₂—CH₃ | —CH(CH₃)₂ | —CH(CH₃)₂ |
| —CH₂—CH₂—CH₃ | —CH(CH₃)₂ | " | —CH₂—CH₂—CH₂—CH₃ |
| —CH₂—CH₂—CH₃ | —CH₂—CH₂—CH₂—CH₃ | | |
| —CH₂—CH₂—CH₃ | —CH(CH₃)(C₂H₅) | " | —CH(CH₃)(C₂H₅) |
| —CH₂—CH₂—CH₃ | —CH₂—CH=CH₂ | " | —CH₂—CH=CH₂ |

TABLE I-continued

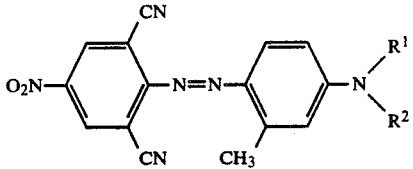
(I)

| R$^1$ | R$^2$ | R$^1$ | R$^2$ |
|---|---|---|---|
| —CH$_2$—CH$_2$—CH$_3$ | —CH(CH$_3$)—CH=CH$_2$ | " | —CH(CH$_3$)—CH=CH$_2$ |
| —CH$_2$—CH$_2$—CH$_3$ | —CH$_2$—C(CH$_3$)=CH$_2$ | " | —CH$_2$—C(CH$_3$)=CH$_2$ |
| —CH$_2$—CH$_2$—CH$_3$ | —CH$_2$—CH=CH—CH$_3$ | " | —CH$_2$—CH=CH—CH$_3$ |
| —CH$_2$—CH=CH$_2$ | —CH$_2$—CH=CH$_2$ | | |
| " | —CH(CH$_3$)—CH=CH$_2$ | | |
| " | —CH$_2$—C(CH$_3$)=CH$_2$ | | |
| " | —CH$_2$—CH=CH—CH$_3$ | | |
| " | —CH$_2$—CH=CH—CH$_3$ | | |
| —CH$_2$—CH$_2$—CH$_2$—CH$_3$ | —CH$_2$—CH$_2$—CH$_2$—CH$_3$ | " | —CH(CH$_3$)(C$_2$H$_5$) |
| —CH$_2$—CH$_2$—CH$_2$—CH$_3$ | —CH(CH$_3$)(C$_2$H$_5$) | —CH(CH$_3$)(C$_2$H$_5$) | —CH$_2$—CH=CH$_2$ |
| " | —CH$_2$—CH=CH$_2$ | " | —CH(CH$_3$)—CH=CH$_2$ |
| " | —CH(CH$_3$)—CH=CH$_2$ | " | —CH$_2$—C(CH$_3$)=CH$_2$ |
| " | —CH$_2$—C(CH$_3$)=CH$_2$ | " | —CH$_2$—CH=CH—CH$_3$ |
| " | —CH$_2$—CH=CH—CH$_3$ | —CH$_2$—C(CH$_3$)=CH$_2$ | —CH$_2$—C(CH$_3$)=CH$_2$ |
| —CH(CH$_3$)—CH=CH$_2$ | —CH(CH$_3$)—CH=CH$_2$ | " | —CH$_2$—CH=CH—CH$_3$ |
| " | —CH$_2$—C(CH$_3$)=CH$_2$ | —CH$_2$—CH=CH—CH$_3$ | —CH$_2$—CH=CH—CH$_3$ |
| " | —CH$_2$—CH=CH—CH$_3$ | | |

Of the dyestuffs of the formula II, the dyestuffs of the following Table II are suitable for use as components of the mixture:

TABLE II (II)

$$O_2N-\text{(benzene with 2 CN)}-N=N-\text{(benzene with }OR^3, CH_3, NR^1R^2)$$

| $R^1$ | $R^2$ | $R^3$ | $R^1$ | $R^2$ | $R^3$ |
|---|---|---|---|---|---|
| —CH$_3$ | —CH$_3$ | —CH$_3$ | —C$_2$H$_5$ | —C$_2$H$_5$ | —CH$_3$ |
| " | —C$_2$H$_5$ | " | " | —CH$_2$CH$_2$CH$_3$ | " |
| " | —CH$_2$CH$_2$CH$_3$ | " | " | —CH(CH$_3$)$_2$ | " |
| " | —CH(CH$_3$)$_2$ | " | " | —CH$_2$—CH$_2$—CH$_2$—CH$_3$ | " |
| " | —CH$_2$—CH$_2$—CH$_2$—CH$_3$ | " | " | —CH(CH$_3$)(C$_2$H$_5$) | " |
| " | —CH(CH$_3$)(C$_2$H$_5$) | " | " | —CH(CH$_3$)—CH=CH$_2$ | " |
| " | —CH$_2$—CH=CH$_2$ | " | " | —CH(CH$_3$)—CH=CH$_2$ | " |
| " | —CH(CH$_3$)—CH=CH$_2$ | " | " | —CH$_2$—C(CH$_3$)=CH$_2$ | " |
| " | —CH$_2$—C(CH$_3$)=CH$_2$ | " | " | —CH$_2$—CH=CH—CH$_3$ | " |
| " | —CH$_2$—CH=CH—CH$_3$ | " | | | |
| —CH$_2$CH$_2$—CH$_3$ | —CH$_2$—CH$_2$—CH$_3$ | " | —CH(CH$_3$)$_2$ | —CH(CH$_3$)$_2$ | " |
| " | —CH(CH$_3$)$_2$ | " | " | —CH$_2$—CH$_2$—CH$_2$—CH$_3$ | " |
| " | —CH$_2$—CH$_2$—CH$_2$—CH$_3$ | " | " | —CH(CH$_3$)(C$_2$H$_5$) | " |
| " | —CH(CH$_3$)(C$_2$H$_5$) | " | " | —CH$_2$—CH=CH$_2$ | " |
| " | —CH(CH$_3$)—CH=CH$_2$ | " | " | —CH(CH$_3$)—CH=CH$_2$ | " |
| " | —CH$_2$—C(CH$_3$)=CH$_2$ | " | " | —CH$_2$—C(CH$_3$)=CH$_2$ | " |

TABLE II-continued

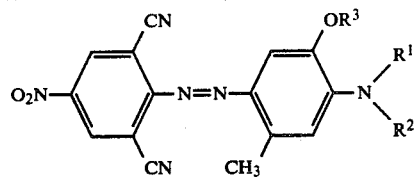
(II)

| R¹ | R² | R³ | R¹ | R² | R³ |
|---|---|---|---|---|---|
| | | | " | —CH₂—CH=CH—CH₃ | " |
| | | | " | —CH(CH₃)(C₂H₅) | " |
| | | | " | —CH₂—CH=CH₂ | " |
| | | | " | —CH(CH₃)—CH=CH₂ | " |
| | | | " | —CH₂—C(CH₃)=CH₂ | " |
| —CH₂—CH₂—CH₂—CH₃ | —CH₂—CH₂—CH₂—CH₃ | " | —CH₂—CH=CH₂ | —CH₂—CH=CH—CH₃ —CH₂—CH=CH₂ | " |
| " | —CH(CH₃)(C₂H₅) | " | " | —CH—CH=CH₂ | " |
| " | —CH₂—CH=CH₂ | " | " | —CH(CH₃)—CH=CH₂ | " |
| " | —CH(CH₃)—CH=CH₂ | " | " | —CH₂—C(CH₃)=CH₂ | " |
| " | —CH₂—C(CH₃)=CH₂ | " | " | —CH₂—CH=CH—CH₃ | " |
| " | —CH₂—CH=CH—CH₃ | " | —CH₂—C(CH₃)=CH₂ | —CH₂—C(CH₃)=CH₂ | " |
| —CH(CH₃)—CH=CH₂ | —CH(CH₃)—CH=CH₂ | " | " | —CH₂—CH=CH—CH₃ | " |
| " | —CH₂—C(CH₃)=CH₂ | " | —CH₂—CH=CH—CH₃ | —CH₂—CH=CH—CH₃ | " |
| | —CH₃—CH₂=CH—CH₃ —CH₃ —C₂H₅ | —C₂H₅ | —C₂H₅ | —C₂H₅ —CH₂CH₂CH₃ | —C₂H₅ |
| —CH₃ | " | " | " | " | " |
| " | —CH₂—CH₂—CH₃ | " | " | —CH(CH₃)(CH₃) | " |
| " | —CH(CH₃)(CH₃) | " | " | —CH₂—CH₂—CH₂—CH₃ | " |

TABLE II-continued $$\text{(II)}$$

Structure: 2,6-dicyano-4-nitrophenyl azo linked to a benzene ring with $OR^3$, $CH_3$, and $N(R^1)(R^2)$ substituents.

| $R^1$ | $R^2$ | $R^3$ | $R^1$ | $R^2$ | $R^3$ |
|---|---|---|---|---|---|
| " | $-CH_2-CH_2-CH_2-CH_3$ | " | " | $-CH(CH_3)(C_2H_5)$ | " |
| " | $-CH(CH_3)(C_2H_5)$ | " | " | $-CH_2-CH=CH_2$ | " |
| " | $-CH_2-CH=CH_2$ | " | " | $-CH(CH_3)-CH=CH_2$ | " |
| " | $-CH(CH_3)-CH=CH_2$ | " | " | $-CH_2-C(CH_3)=CH_2$ | " |
| " | $-CH_2-C(CH_3)=CH_2$ | " | " | $-CH_2-CH=CH-CH_3$ | " |
| " | $-CH_2-CH=CH-CH_3$ | " | | | |
| $-CH_2-CH_2-CH_3$ | $-CH_2-CH_2-CH_3$ | " | $-CH(CH_3)_2$ | $-CH(CH_3)_2$ | " |
| " | $-CH(CH_3)_2$ | " | " | $-CH_2-CH_2-CH_2-CH_3$ | " |
| " | $-CH_2-CH_2-CH_2-CH_3$ | " | " | $-CH(CH_3)(C_2H_5)$ | " |
| " | $-CH(CH_3)(C_2H_5)$ | " | " | $-CH_2-CH=CH_2$ | " |
| " | $-CH_2-CH=CH_2$ | " | " | $-CH(CH_3)-CH=CH_2$ | " |
| " | $-CH(CH_3)-CH=CH_2$ | " | " | $-CH_2-C(CH_3)=CH_2$ | " |
| " | $-CH_2-C(CH_3)=CH_2$ | " | " | $-CH_2-CH=CH-CH_3$ | " |
| $-CH_2-CH_2-CH_2-CH_3$ | $-CH_2-CH_2-CH_2-CH_3$ | " | $-CH(CH_3)(C_2H_5)$ | $-CH(CH_3)(C_2H_5)$ | " |

TABLE II-continued

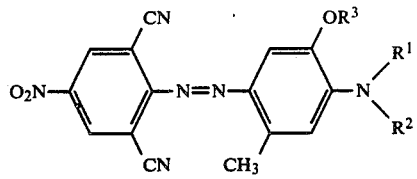

(II)

| $R^1$ | $R^2$ | $R^3$ | $R^1$ | $R^2$ | $R^3$ |
|---|---|---|---|---|---|
| " | $-CH(CH_3)_2$ | " | " | $-CH_2-CH=CH_2$ | " |
| " | $-CH_2-CH=CH_2$ | " | " | $-CH(CH_3)-CH=CH_2$ | " |
| " | $-CH(CH_3)-CH=CH_2$ | " | " | $-CH_2-C(CH_3)=CH_2$ | " |
| " | $-CH_2-C(CH_3)=CH_2$ | " | " | $-CH_2-CH=CH-CH_3$ | " |
| $-CH_2-CH=CH_2$ | $-CH_2-CH=CH-CH_3$ $-CH_2-CH=CH_2$ | " " | " | " | |
| " | $-CH(CH_3)-CH=CH_2$ | " | | | |
| " | $-CH_2-C(CH_3)=CH_2$ | " | | | |
| " | $-CH_2-CH=CH-CH_3$ | " | | | |
| $-CH(CH_3)-CH=CH_2$ | $-CH(CH_3)-CH=CH_2$ | " | $-CH_2-C(CH_3)=CH_2$ | $-CH_2-C(CH_3)=CH_2$ | " |
| " | $-CH_2-C(CH_3)=CH_2$ | " | " | $-CH_2-CH=CH-CH_3$ | " |
| " | $-CH_2-CH=CH-CH_3$ | " | $-CH_2-CH=CH-CH_3$ | $-CH_2-CH=CH-CH_3$ | " |

Of the dyestuffs of the formula III, the dyestuffs of the following Table IIIa are suitable for use as components of the mixture:

TABLE IIIa

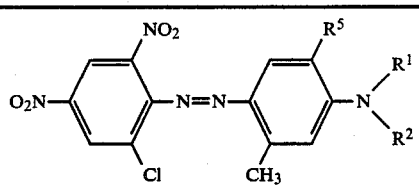

(III, $R^4$ = Cl)

| $R^1$ | $R^2$ | $R^5$ | $R^1$ | $R^2$ | $R^5$ |
|---|---|---|---|---|---|
| $-CH_3$ | $-CH_3$ | $-H$ | | | |
| " | $-C_2H_5$ | " | $-C_2H_5$ | $-C_2H_5$ | $-H$ |
| " | $-CH_2-CH_2-CH_3$ | " | " | $-CH_2-CH_2-CH_3$ | " |
| " | $-CH(CH_3)_2$ | " | " | $-CH(CH_3)_2$ | " |
| " | $-CH_2-CH_2-CH_2-CH_3$ | " | " | $-CH_2-CH_2-CH_2-CH_3$ | " |

TABLE IIIa-continued $$\text{(III, } R^4 = Cl\text{)}$$

Structure: 2,4-dinitro-6-chlorophenyl-azo-[2-methyl-5-$R^5$-4-($NR^1R^2$)phenyl]

| $R^1$ | $R^2$ | $R^5$ | $R^1$ | $R^2$ | $R^5$ |
|---|---|---|---|---|---|
| " | $-CH(CH_3)C_2H_5$ | " | " | $-CH(CH_3)C_2H_5$ | " |
| " | $-CH_2-CH=CH_2$ | " | " | $-CH_2-CH=CH_2$ | " |
| " | $-CH(CH_3)-CH=CH_2$ | " | " | $-CH(CH_3)-CH=CH_2$ | " |
| " | $-CH_2-C(CH_3)=CH_2$ | " | " | $-CH_2-C(CH_3)=CH_2$ | " |
| " | $-CH_2-CH=CH-CH_3$ | " | " | $-CH_2-CH=CH-CH_3$ | " |
| $-CH_2-CH_2-CH_3$ | $-CH_2-CH_2-CH_3$ | $-H$ | $-CH(CH_3)_2$ | $-CH(CH_3)_2$ | $-H$ |
| " | $-CH(CH_3)_2$ | " | " | $-CH_2-CH_2-CH_2-CH_3$ | " |
| " | $-CH_2-CH_2-CH_2-CH_3$ | " | " | $-CH(CH_3)C_2H_5$ | " |
| " | $-CH(CH_3)C_2H_5$ | " | " | $-CH_2-CH=CH_2$ | " |
| " | $-CH_2-CH=CH_2$ | " | " | $-CH(CH_3)-CH=CH_2$ | " |
| " | $-CH(CH_3)-CH=CH_2$ | " | " | $-CH_2-C(CH_3)=CH_2$ | " |
| " | $-CH_2-C(CH_3)=CH_2$ | " | " | $-CH_2-CH=CH-CH_3$ | " |
| " | $-CH_2-CH=CH-CH_3$ | " | | | |
| $-CH_2-CH_2-CH_2-CH_3$ | $-CH_2-CH_2-CH_2-CH_3$ | $-H$ | $-CH(CH_3)C_2H_5$ | $-CH(CH_3)C_2H_5$ | " |
| " | $-CH(CH_3)C_2H_5$ | " | " | $-CH(CH_3)-CH=CH_2$ | " |
| " | $-CH_2-CH=CH_2$ | " | " | $-CH_2-CH=CH_2$ | " |

TABLE IIIa-continued

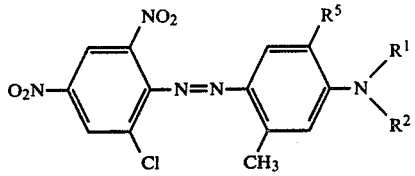

(III, R⁴ = Cl)

| $R^1$ | $R^2$ | $R^5$ | $R^1$ | $R^2$ | $R^5$ |
|---|---|---|---|---|---|
| " | −CH−CH=CH₂<br>\|<br>CH₃ | " | " | −CH₂−C=CH₂<br>\|<br>CH₃ | " |
| " | −CH₂−C=CH₂<br>\|<br>CH₃ | " | " | −CH₂−CH=CH−CH₃ | " |
| " | −CH₂−CH=CH−CH₃ | " | | | |
| −CH₂−CH=CH₂ | −CH₂−CH=CH₂ | " | | | |
| " | −CH−CH=CH₂<br>\|<br>CH₃ | " | | | |
| " | −CH₂−C=CH₂<br>\|<br>CH₃ | " | | | |
| " | −CH₂−CH=CH−CH₃ | " | | | |
| −CH−CH=CH₂<br>\|<br>CH₃ | −CH−CH=CH₂<br>\|<br>CH₃ | −H | −CH₂−C=CH₂<br>\|<br>CH₃ | −CH₂−C=CH₂<br>\|<br>CH₃ | " |
| " | −CH₂−C=CH₂<br>\|<br>CH₃ | " | " | −CH₂−CH=CH−CH₃ | " |
| " | −CH₂−CH=CH−CH₃ | " | −CH₂−CH=CH−CH₃ | −CH₂−CH=CH−CH₃ | " |
| −CH₃ | −CH₃ | −OCH₃ | −C₂H₅ | −C₂H₅ | −OCH₃ |
| " | −C₂H₅ | " | " | −CH₂−CH₂−CH₃ | " |
| " | −CH₂−CH₂−CH₃ | " | " | −CH<(CH₃)(CH₃) | " |
| " | −CH<(CH₃)(CH₃) | " | " | −CH₂−CH₂−CH₂−CH₃ | " |
| " | −CH₂−CH₂−CH₂−CH₃ | " | " | −CH<(CH₃)(C₂H₅) | " |
| " | −CH<(CH₃)(C₂H₅) | " | " | −CH₂−CH=CH₂ | " |
| " | −CH₂−CH=CH₂ | " | " | −CH−CH=CH₂<br>\|<br>CH₃ | " |
| " | −CH−CH=CH₂<br>\|<br>CH₃ | −OCH₃ | −C₂H₅ | −CH₂−C=CH₂<br>\|<br>CH₃ | " |

TABLE IIIa-continued

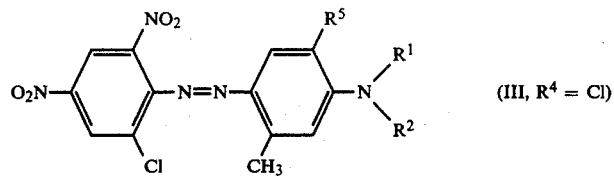

(III, R⁴ = Cl)

| R¹ | R² | R⁵ | R¹ | R² | R⁵ |
|---|---|---|---|---|---|
| " | $-CH_2-\underset{CH_3}{\underset{|}{C}}=CH_2$ | " | " | $-CH_2-CH=CH-CH_3$ | " |
| " | $-CH_2-CH=CH-CH_3$ | " | | | |
| $-CH_2-CH_2-CH_3$ | $-CH_2-CH_2-CH_3$ | " | $-CH_2-CH_2-CH_3$ | $-\underset{CH_3}{\underset{|}{CH}}-CH_3$ | $-OCH_3$ |
| " | $-\underset{CH_3}{\underset{|}{CH}}-CH_3$ | " | " | $-CH_2-CH_2-CH_2-CH_3$ | " |
| " | $-CH_2-CH_2-CH_2-CH_3$ | " | " | $-\underset{C_2H_5}{\underset{|}{CH}}-CH_3$ | " |
| " | $-\underset{C_2H_5}{\underset{|}{CH}}-CH_3$ | " | " | $-CH_2-CH=CH_2$ | " |
| " | $-CH_2-CH=CH_2$ | " | " | $-\underset{CH_3}{\underset{|}{CH}}-CH=CH_2$ | " |
| " | $-\underset{CH_3}{\underset{|}{CH}}-CH=CH_2$ | " | " | $-CH_2-CH=CH-CH_3$ | " |
| " | $-CH_2-CH=CH-CH_3$ | " | $-CH_2-CH=CH_2$ | $-CH_2-CH=CH_2$ | " |
| $-CH_3$ | $-CH_3$ | $-OC_2H_5$ | $-C_2H_5$ | $-C_2H_5$ | $-OC_2H_5$ |
| " | $-C_2H_5$ | " | " | $-CH_2-CH_2-CH_3$ | " |
| " | $-CH_2-CH_2-CH_3$ | " | " | $-\underset{CH_3}{\underset{|}{CH}}-CH_3$ | " |
| " | $-\underset{CH_3}{\underset{|}{CH}}-CH_3$ | " | " | $-CH_2-CH_2-CH_2-CH_3$ | " |
| " | $-CH_2-CH_2-CH_2-CH_3$ | " | " | $-\underset{C_2H_5}{\underset{|}{CH}}-CH_3$ | " |
| " | $-\underset{C_2H_5}{\underset{|}{CH}}-CH_3$ | " | " | $-CH_2-CH=CH_2$ | " |
| " | $-CH_2-CH=CH_2$ | " | " | $-\underset{CH_3}{\underset{|}{CH}}-CH=CH_2$ | " |

TABLE IIIa-continued

[Structure: 2,4-dinitro-6-chlorophenyl-azo-(2-methyl-5-R⁵-4-NR¹R²)benzene] (III, R⁴ = Cl)

| R¹ | R² | R⁵ | R¹ | R² | R⁵ |
|---|---|---|---|---|---|
| " | $-CH-C=CH_2$<br>    $\|$<br>    $CH_3$ | " | " | $-CH_2-C=CH_2$<br>       $\|$<br>       $CH_3$ | " |
| " | $-CH_2-C=CH_2$<br>       $\|$<br>       $CH_3$ | " | " | $-CH_2-CH=CH-CH_3$ | " |
| " | $-CH_2-CH=CH-CH_3$ | " | | | |
| $-CH_2-CH_2-CH_3$ | $-CH_2-CH_2-CH_3$ | " | $-CH_2-CH_2-CH_2-CH_3$ | $-CH\underset{CH_3}{\overset{CH_3}{<}}$ | " |
| " | $-CH\underset{CH_3}{\overset{CH_3}{<}}$ | " | " | $-CH_2-CH_2-CH_2-CH_3$ | " |
| " | $-CH_2-CH_2-CH_2-CH_3$ | " | " | $-CH\underset{C_2H_5}{\overset{CH_3}{<}}$ | " |
| " | $-CH\underset{C_2H_5}{\overset{CH_3}{<}}$ | " | " | $-CH_2-CH=CH_2$ | " |
| " | $-CH-CH=CH_2$<br>    $\|$<br>    $CH_3$ | " | " | $-CH-CH=CH_2$<br>    $\|$<br>    $CH_3$ | " |
| " | $-CH_2-C=CH_2$<br>       $\|$<br>       $CH_3$ | " | " | $-CH_2-CH=CH-CH_3$ | " |
| " | $-CH_2-CH=CH-CH_3$ | " | $-CH_2-CH=CH_2$ | $-CH_2=CH=CH_2$ | " |

Of the dyestuffs of the formula III, the dyestuffs of the following Table IIIb are suitable for use as components of the mixture:

TABLE IIIb

[Structure: 2,4-dinitro-6-bromophenyl-azo-(2-methyl-5-R⁵-4-NR¹R²)benzene] (III, R⁴ = Br)

| R¹ | R² | R⁵ | R¹ | R² | R⁵ |
|---|---|---|---|---|---|
| $-CH_3$ | $-CH_3$<br>$-C_2H_5$ | $-H$<br>" | $-C_2H_5$<br>" | $-C_2H_5$<br>$-CH_2-CH_2-CH_3$ | $-H$<br>" |
| " | $-CH_2-CH_2-CH_3$ | " | " | $-CH\underset{CH_3}{\overset{CH_3}{<}}$ | " |

TABLE IIIb-continued

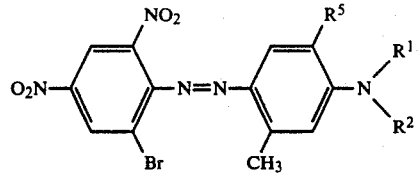

(III, R⁴ = Br)

| R¹ | R² | R⁵ | R¹ | R² | R⁵ |
|---|---|---|---|---|---|
| " | —CH(CH₃)₂ (isopropyl) | " | " | —CH₂—CH₂—CH₂—CH₃ | " |
| " | —CH₂—CH₂—CH₂—CH₃ | " | " | —CH(CH₃)(C₂H₅) | " |
| " | —CH(CH₃)(C₂H₅) | " | " | —CH₂—CH=CH₂ | " |
| " | —CH₂—CH=CH₂ | " | " | —CH(CH₃)—CH=CH₂ | " |
| " | —CH(CH₃)—CH=CH₂ | " | " | —CH₂—C(CH₃)=CH₂ | " |
| " | —CH₂—C(CH₃)=CH₂ | " | " | —CH₂—CH=CH—CH₃ | " |
| " | —CH₂—CH=CH—CH₃ | " | | | |
| —CH₂—CH₂—CH₃ | —CH₂—CH₂—CH₃ | " | —CH(CH₃)₂ | —CH(CH₃)₂ | " |
| " | —CH(CH₃)₂ | " | " | —CH₂—CH₂—CH₂—CH₃ | " |
| " | —CH₂—CH₂—CH₂—CH₃ | " | " | —CH(CH₃)(C₂H₅) | " |
| " | —CH(CH₃)(C₂H₅) | " | " | —CH₂—CH=CH₂ | " |
| " | —CH₂—CH=CH₂ | " | " | —CH(CH₃)—CH=CH₂ | " |
| " | —CH(CH₃)—CH=CH₂ | " | " | —CH₂—C(CH₃)=CH₂ | " |
| " | —CH₂—C(CH₃)=CH₂ | " | " | —CH₂—CH=CH—CH₃ | " |

TABLE IIIb-continued $$\text{O}_2\text{N}-\underset{\underset{\text{Br}}{|}}{\overset{\overset{\text{NO}_2}{|}}{\bigcirc}}-\text{N}=\text{N}-\underset{\underset{\text{CH}_3}{|}}{\overset{\overset{\text{R}^5}{|}}{\bigcirc}}-\text{N}\underset{\text{R}^2}{\overset{\text{R}^1}{\diagup}}\qquad (\text{III, R}^4 = \text{Br})$$

| R¹ | R² | R⁵ | R¹ | R² | R⁵ |
|---|---|---|---|---|---|
| —CH₂—CH₂—CH₂—CH₃ | —CH₂—CH₂—CH₂—CH₃ | " | —C(CH₃)(C₂H₅)— | —C(CH₃)(C₂H₅)— | " |
| " | —CH(CH₃)(C₂H₅) | " | " | —CH₂—CH=CH₂ | " |
| " | —CH₂—CH₂—CH₂—CH₃ | " | " | —CH(CH₃)—CH=CH₂ | " |
| " | —CH(CH₃)—CH=CH₂ | " | " | —CH—C(CH₃)=CH₂ | " |
| " | —CH₂—C(CH₃)=CH₂ | " | " | —CH₂—CH=CH—CH₃ | " |
| " | —CH₂—CH=CH—CH₃ | " | | | |
| —CH₂—CH=CH₂ | —CH₂—CH=CH₂ | " | | | |
| " | —CH(CH₃)—CH=CH₂ | " | | | |
| " | —CH₂—C(CH₃)=CH₂ | " | | | |
| " | —CH₂—CH=CH—CH₃ | " | | | |
| —CH(CH₃)—CH=CH₂ | —CH(CH₃)—CH=CH₂ | " | —CH₂—C(CH₃)=CH₂ | —CH₂—C(CH₃)=CH₂ | " |
| " | —CH₂—C(CH₃)H—CH₂ | " | " | —CH₂—CH=CH—CH₃ | " |
| —CH₃ | —CH₃ | —OCH₃ | —CH₂—CH=CH—CH₃ / —C₂H₅ | —CH₂—CH=CH—CH₃ / —C₂H₅ | —OCH₃ |
| " | —C₂H₅ | " | " | —CH₂—CH₂—CH₃ | " |
| " | —CH₂—CH₂—CH₃ | " | " | —CH(CH₃)₂ | " |
| " | —CH(CH₃)₂ | " | " | —CH₂—CH₂—CH₂—CH₃ | " |
| " | —CH₂—CH—CH—CH₃ | " | " | —CH(CH₃)(C₂H₅) | " |

TABLE IIIb-continued $$\text{O}_2\text{N}-\underset{\underset{\text{Br}}{|}}{\overset{\overset{\text{NO}_2}{|}}{\bigcirc}}-N=N-\underset{\underset{\text{CH}_3}{|}}{\overset{\overset{R^5}{|}}{\bigcirc}}-N\underset{R^2}{\overset{R^1}{<}}$$

(III, $R^4$ = Br)

| $R^1$ | $R^2$ | $R^5$ | $R^1$ | $R^2$ | $R^5$ |
|---|---|---|---|---|---|
| " | $-CH(CH_3)C_2H_5$ | " | " | $-CH_2-CH=CH_2$ | " |
| " | $-CH_2-CH=CH_2$ | " | " | $-CH(CH_3)-CH=CH_2$ | " |
| " | $-CH(CH_3)-CH=CH_2$ | " | " | $-CH_2-C(CH_3)=CH_2$ | " |
| " | $-CH_2-C(CH_3)=CH_2$ | " | " | $-CH_2-CH=CH-CH_3$ | " |
| " | $-CH_2-CH=CH-CH_3$ | " | | | |
| $-CH_2-CH_2-CH_3$ | $-CH_2-CH_2-CH_3$ | " | $-CH_2-CH_2-CH_2-CH_3$ | $-CH(CH_3)_2$ | " |
| " | $-CH(CH_3)_2$ | " | " | $-CH_2-CH_2-CH_2-CH_3$ | " |
| " | $-CH_2-CH_2-CH_2-CH_3$ | " | " | $-CH(CH_3)C_2H_5$ | " |
| " | $-CH(CH_3)C_2H_5$ | " | " | $-CH_2-CH=CH_2$ | " |
| " | $-CH_2-CH=CH_2$ | " | | | |
| " | $-CH(CH_3)-CH=CH_2$ | " | $-CH_2-CH_2-CH_2-CH_3$ | $-CH_2-CH=CH-CH_3$ | " |
| " | $-CH(CH_3)-CH=CH_2$ | " | " | $-CH(CH_3)-CH=CH_2$ | " |
| " | $-CH_2-C(CH_3)=CH_2$ | " | | | |
| " | $-CH_2-CH=CH-CH_3$ | " | $-CH_2-CH=CH_2$ | $-CH_2-CH=CH_2$ | " |
| $-CH_3$ | $-CH_3$ | $-OC_2H_5$ | $-C_2H_5$ | $-C_2H_5$ | $-OC_2H_5$ |
| | $-C_2H_5$ | " | " | $-CH_2-CH_2-CH_3$ | " |
| | $-CH_2-CH_2-CH_3$ | " | " | $-CH(CH_3)_2$ | " |

TABLE IIIb-continued $$\text{O}_2\text{N}-\underset{\underset{\text{Br}}{|}}{\overset{\overset{\text{NO}_2}{|}}{C_6H_2}}-N=N-\underset{\underset{\text{CH}_3}{|}}{\overset{\overset{R^5}{|}}{C_6H_2}}-N\overset{R^1}{\underset{R^2}{}}$$

(III, $R^4 = Br$)

| $R^1$ | $R^2$ | $R^5$ | $R^1$ | $R^2$ | $R^5$ |
|---|---|---|---|---|---|
| " | $-CH(CH_3)_2$ | " | " | $-CH_2-CH_2-CH_2-CH_3$ | " |
| " | $-CH_2-CH_2-CH_2-CH_3$ | " | " | $-CH(CH_3)(C_2H_5)$ | " |
| " | $-CH(CH_3)(C_2H_5)$ | " | " | $-CH_2-CH=CH_2$ | " |
| " | $-CH_2-CH=CH_2$ | " | " | $-CH(CH_3)-CH=CH_2$ | " |
| " | $-CH(CH_3)-CH=CH_2$ | " | $-C_2H_5$ | $-CH_2-C(CH_3)=CH_2$ | " |
| " | $-CH_2-C(CH_3)=CH_2$ | " | " | $-CH_2-CH=CH-CH_3$ | " |
| " | $-CH_2-CH=CH-CH_3$ | " | | | |
| $-CH_2-CH_2-CH_3$ | $-CH_2-CH_2-CH_3$ | " | $-CH_2-CH_2-CH_2-CH_3$ | $-CH(CH_3)_2$ | " |
| " | $-CH(CH_3)_2$ | " | " | $-CH_2-CH_2-CH_2-CH_3$ | " |
| " | $-CH_2-CH_2-CH_2-CH_3$ | " | " | $-CH(CH_3)(C_2H_5)$ | " |
| " | $-CH(CH_3)(C_2H_5)$ | " | " | $-CH_2-CH=CH_2$ | " |
| " | $-CH_2-CH=CH_2$ | " | " | $-CH(CH_3)-CH=CH_2$ | " |
| " | $-CH(CH_3)-CH=CH_2$ | " | " | $-CH_2-CH=CH-CH_3$ | " |
| | | | $-CH_2-CH=CH_2$ | $-CH_2-CH=CH_2$ | " |

Of the dyestuffs of the formula IV, the dyestuffs of the following Table IVa are suitable for use as components of the mixture:

TABLE IVa

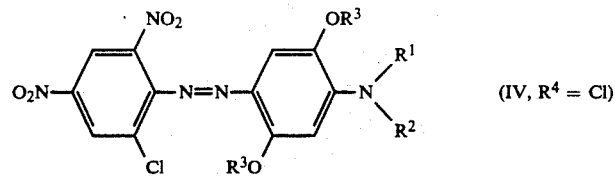

(IV, R⁴ = Cl)

| R¹ | R² | R³ | R¹ | R² | R³ |
|---|---|---|---|---|---|
| —CH₃ | —CH₃ | —CH₃ | —C₂H₅ | —C₂H₅ | —CH₃ |
| " | —C₂H₅ | " | " | —CH₂—CH₂—CH₃ | " |
| " | —CH₂—CH₂—CH₃ | " | " | —CH(CH₃)₂ | " |
| " | —CH(CH₃)₂ | " | " | —CH₂—CH₂—CH₂—CH₃ | " |
| " | —CH₂—CH₂—CH₂—CH₃ | " | " | —CH(CH₃)C₂H₅ | " |
| " | —CH(CH₃)C₂H₅ | " | " | —CH₂—CH=CH₂ | " |
| " | —CH₂—CH=CH₂ | " | " | —CH(CH₃)—CH=CH₂ | " |
| " | —CH(CH₃)—CH=CH₂ | " | " | —CH₂—C(CH₃)=CH₂ | " |
| " | —CH₂—C(CH₃)=CH₂ | " | " | —CH₂—CH=CH—CH₃ | " |
| " | —CH₂—CH=CH—CH₃ | " | | | |
| —CH₂—CH₂—CH₃ | —CH₂—CH₂—CH₃ | " | —CH₂—CH₂—CH₂—CH₃ | —CH(CH₃)₂ | " |
| " | —CH(CH₃)₂ | " | " | —CH₂—CH₂—CH₂—CH₃ | " |
| " | —CH₂—CH₂—CH₂—CH₃ | " | " | —CH(CH₃)C₂H₅ | " |
| " | —CH(CH₃)C₂H₅ | " | " | —CH₂—CH=CH₂ | " |
| " | —CH₂—CH=CH₂ | " | " | —CH(CH₃)—CH=CH₂ | " |
| " | —CH(CH₃)—CH=CH₂ | " | " | —CH₂—CH=CH—CH₃ | " |

TABLE IVa-continued

Structure: 2,4-dinitro-6-chlorophenyl-azo-[2,5-bis(OR³)-4-(NR¹R²)phenyl] (IV, R⁴ = Cl)

| R¹ | R² | R³ | R¹ | R² | R³ |
|---|---|---|---|---|---|
| —CH₃ | —CH₃ | —C₂H₅ | —CH₂—CH=CH₂ | —CH₂—CH=CH₂ | " |
| " | —C₂H₅ | " | —C₂H₅ | —C₂H₅ | —C₂H₅ |
| " | —CH₂—CH₂—CH₃ | " | " | —CH₂—CH₂—CH₃ | " |
| " | —CH(CH₃)₂ | " | " | —CH(CH₃)₂ | " |
| " | —CH₂—CH₂—CH₂—CH₃ | " | " | —CH₂—CH₂—CH₂—CH₃ | " |
| " | —CH(CH₃)(C₂H₅) | " | " | —CH(CH₃)(C₂H₅) | " |
| " | —CH₂—CH=CH₂ | " | " | —CH₂—CH=CH₂ | " |
| " | —CH(CH₃)—CH=CH₂ | " | " | —CH(CH₃)—CH=CH₂ | " |
| " | —CH₂—C(CH₃)=CH₂ | " | " | —CH₂—C(CH₃)=CH₂ | " |
| " | —CH₂—CH=CH—CH₃ | " | " | —CH₂—CH=CH—CH₃ | " |
| —CH₂—CH₂—CH₃ | —CH₂—CH₂—CH₃ | " | —CH₂—CH₂—CH₃ | —CH(CH₃)₂ | " |
| " | —CH(CH₃)₂ | " | " | —CH₂—CH₂—CH₂—CH₃ | " |
| " | —CH₂—CH₂—CH₂—CH₃ | " | " | —CH(CH₃)(C₂H₅) | " |
| " | —CH(CH₃)(C₂H₅) | " | " | —CH₂—CH=CH₂ | " |
| " | —CH(CH₃)—CH=CH₂ | " | " | —CH₂—CH=CH—CH₃ | " |
| " | —CH₂—CH=CH—CH₃ | " | —CH₂—CH=CH₂ | —CH₂—CH=CH₂ | " |

Of the dyestuffs of the formula IV, the dyestuffs of the following Table IVb are suitable for use as components of the mixture:

TABLE IVb (IV, R⁴ = Br)

Structure: 2,4-dinitro-6-bromo-phenyl—N=N—phenyl(OR³)(OR³)(NR¹R²)

| R¹ | R² | R³ | R¹ | R² | R³ |
|---|---|---|---|---|---|
| —CH₃ | —CH₃ | —CH₃ | —C₂H₅ | —C₂H₅ | —CH₃ |
| " | —C₂H₅ | " | " | —CH₂—CH₂—CH₃ | " |
| " | —CH₂—CH₂—CH₃ | " | " | —CH(CH₃)₂ | " |
| " | —CH(CH₃)₂ | " | " | —CH₂—CH₂—CH₂—CH₃ | " |
| CH₃ | —CH₂—CH₂—CH₂—CH₃ | " | " | —CH(CH₃)(C₂H₅) | " |
| " | —CH(CH₃)(C₂H₅) | " | " | —CH₂—CH=CH₂ | " |
| " | —CH₂—CH=CH₂ | " | " | —CH(CH₃)—CH=CH₂ | " |
| " | —CH(CH₃)—CH=CH₂ | " | " | —CH₂—C(CH₃)=CH₂ | " |
| " | —CH₂—C(CH₃)=CH₂ | " | " | —CH₂—CH=CH—CH₃ | " |
| " | —CH₂—CH=CH—CH₃ | " | | | |
| —CH₂—CH₂—CH₃ | —CH₂—CH₂—CH₃ | " | —CH₂—CH₂—CH₂—CH₃ | —CH(CH₃)₂ | " |
| " | —CH(CH₃)₂ | " | | —CH₂—CH₂—CH₂—CH₃ | " |
| " | —CH₂—CH₂—CH₂—CH₃ | " | | —CH(CH₃)(C₂H₅) | " |
| " | —CH(CH₃)(C₂H₅) | " | —CH₂—CH₂—CH₂—CH₃ | —CH₂—CH=CH₂ | " |
| " | —CH₂—CH=CH₂ | " | " | —CH(CH₃)—CH=CH₂ | " |

TABLE IVb-continued

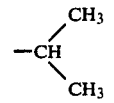

(IV, R⁴ = Br)

| R¹ | R² | R³ | R¹ | R² | R³ |
|---|---|---|---|---|---|
| " | —CH(CH₃)—CH=CH₂ | " |  | —CH₂—CH=CH—CH₃ | " |
| " | —CH₂—CH=CH—CH₃ | " | —CH₂—CH=CH₂ | —CH₂—CH=CH₂ | " |
| —CH₃ | —CH₃ | —C₂H₅ | —C₂H₅ | —C₂H₅ | —C₂H₅ |
| " | —C₂H₅ | " |  | —CH₂—CH₂—CH₃ | " |
| " | —CH₂—CH₂—CH₃ | " |  | —CH(CH₃)₂ | " |
| " | —CH(CH₃)₂ | " |  | —CH₂—CH₂—CH₂—CH₃ | " |
| " | —CH₂—CH₂—CH₂—CH₃ | " |  | —CH(CH₃)(C₂H₅) | " |
| " | —CH(CH₃)(C₂H₅) | " |  | —CH₂—CH=CH₂ | " |
| " | —CH₂—CH=CH₂ | " |  | —CH(CH₃)—CH=CH₂ | " |
| " | —CH(CH₃)—CH=CH₂ | " |  | —CH₂—C(CH₃)=CH₂ | " |
| " | —CH₂—C(CH₃)=CH₂ | " |  | —CH₂—CH=CH—CH₃ | " |
| " | —CH₂—CH=CH—CH₃ | " |  |  |  |
| —CH₂—CH₂—CH₃ | —CH₂—CH₂—CH₃ | " | —CH₂—CH₂—CH₃ | —CH(CH₃)₂ | " |
| " | —CH(CH₃)₂ | " |  | —CH₂—CH₂—CH₂—CH₃ | " |
| " | —CH₂—CH₂—CH₂—CH₃ | " |  | —CH(CH₃)(C₂H₅) | " |
| " | —CH(CH₃)(C₂H₅) | " |  | —CH₂—CH=CH₂ | " |

TABLE IVb-continued $$\text{O}_2\text{N}-\underset{\underset{\text{Br}}{|}}{\overset{\overset{\text{NO}_2}{|}}{\text{C}_6\text{H}_2}}-\text{N}=\text{N}-\underset{\underset{\text{R}^3\text{O}}{|}}{\overset{\overset{\text{OR}^3}{|}}{\text{C}_6\text{H}_2}}-\text{N}\underset{\text{R}^2}{\overset{\text{R}^1}{\diagup\!\!\!\diagdown}} \qquad (\text{IV, R}^4 = \text{Br})$$

| R¹ | R² | R³ | R¹ | R² | R³ |
|---|---|---|---|---|---|
| " | —CH₂—CH=CH₂ | " | " | —CH—CH=CH₂<br>\|<br>CH₃ | " |
| " | —CH—CH=CH₂<br>\|<br>CH₃ | " | " | —CH₂—CH=CH—CH₃ | " |
| " | —CH₂—CH=CH—CH₃ | " | —CH₂—CH=CH₂ | —CH₂—CH=CH₂ | " |

The novel preparations of the disperse blue dyestuffs of the formulae I to VII can be prepared by mixing fully finished (finely water-dispersible) dyestuff preparations of the underlying individual dyestuffs; by jointly finishing the underlying individual dyestuffs as mixture, i.e. by jointly wet-milling mixtures of the individual dyestuffs in the presence of conventional nonionic or anionic dispersants (for example ligninsulfonate) in a conventional bead mill, if desired under conditions where mix-crystals can form from the underlying individual dyestuffs; or by finishing a mix-crystal, obtained through special reaction conditions, for example by common azo coupling or common cyano exchange, of the individual dyestuff components involved therein.

The process of common azo coupling or common cyano exchange is known, for example in the form where the common cyano exchange is carried out by reacting chlorine or bromine substituents in the parent dyestuffs of the azo series at 20° to 220° C. with metal cyanides (cf. DE-B-1,544,563).

The dyestuff preparations described by the invention can be used to color synthetic fiber material, primarily PES fiber based on polyethylene terephthalate, polybutylene terephthalate or polycyclohexylene terephthalate, as well as fibers which are derived from the copolymers of such PES with diethylene glycol, triethylene glycol, isophthalic acid or benzo-1,4-diphosphorous acid as incorporated component. However, PES fibers which have been modified in some other way can be equally successfully dyed with the dyestuff mixtures according to the invention.

Furthermore, the dyeing according to the invention can be carried out on PES fibers which are mixed with fiber material of natural origin, such as wool or cotton, or with regenerated cellulose in mixing ratios of 10 to 90%, preferably 30 to 70%, PES content.

The present invention can in principle be used for dyeing the abovementioned fiber material at various stages of processing, for example as loose fiber, slubbing, yarn or piece goods.

The dyeing of synthetic fibers or mixtures thereof with the dyestuff mixtures or mix-crystals according to the invention is carried out in accordance with the traditional exhaust-dyeing method. Particularly noteworthy in this context is the use of this technique for exhaust-dyeing when the treatment liquor is at the boil in dyeing apparatus which is open to the atmosphere, for example in reel becks, in the presence or absence of customary carriers based on, for example, o-phenylphenol, dichlorobenzenes, trichlorobenzenes, methylnaphthalenes, chloronaphthalenes, alkyl benzoates or cresotates, diphenyl and the like and in the absence or presence of customary dispersing and/or leveling agents. Furthermore, the dyeing can also be effected using a conventional high-temperature (HT) exhaustion method, at temperatures between 105° and 140° C. The actual dyeing is advantageously followed by reduction clearing or a dispersant-aided aftertreatment of the dyed goods to remove unfixed dyestuff portions.

If mixtures of PES fibers with wool, cotton or regenerated cellulose fibers are used, the adjacent fiber component can be dyed with suitable dyestuffs in the same or different shade (marls, weave patterns) before or after the PES dyeing is carried out.

The dye mixtures or mix-crystals according to the invention can be used not only by themselves (i.e. in the blue region)—to produce blue self-shade dyeings—but also in combination with other commercially available disperse dyestuffs of a different structural type which likewise produce blue shades or even in combination with dyestuffs which produce hues other than blue, for example, yellow and red disperse dyestuffs (trichromatic dyeing). This kind of compatibility is however tied to the precondition that under the prevailing dyeing conditions all the dyestuffs involved have substantially the same exhaustion profiles. The obtainable light fastness of these dyeings is good in the blue and the trichromatic region. These shading dyestuffs can be present from the start in the ready-to-use preparation of the dyestuffs having the formulae I to IV or they are added directly to the liquor when the dyeing operation is carried out.

The use of the dyestuff mixtures or mix-crystals according to the invention leads to bright deep blue dyeings on the synthetic fiber material depending on the mixing ratio of the individual components. The depth of shade is significantly higher than with anthraquinonoid blue dyestuffs and their mixtures with various azo dyestuffs. For instance, the 1/1 and 2/1 standard depths of shade (SDS) which are customary among those skilled in the art of dyeing are obtained in a customary polyester dyeing at the boil in the presence of carrier using the following dyestuff levels (based on the pure dyestuff content of the finished dyestuff and on the weight of fiber):

| Dyestuff of the formula (C.I. Disperse Blue 56) [structure: anthraquinone with HO, NH2, Br, H2N, OH] | 1/1 SDS 0.5% | 2/1 SDS 1.1% |
|---|---|---|
| Mixture* of 62 parts by weight of dyestuff of the formula [O2N-phenyl(CN,CN)-N=N-phenyl(CH3)-N(C2H5)2] and 38 parts by weight of dyestuff of the formula [O2N-phenyl(CN,CN)-N=N-phenyl(OCH3,CH3)-N(C2H5)2] (*in the form of a mix-crystal) | 1/1 SDS 0.19% | 2/1 SDS 0.4% |
| Mixture of 55 parts by weight of dyestuff of the formula [O2N-phenyl(CN,CN)-N=N-phenyl(CH3)-N(C2H5)2] and 35 parts by weight of dyestuff of the formula [O2N-phenyl(CN,CN)-N=N-phenyl(OCH3,CH3)-N(C2H5)2] and 10 parts by weight of dyestuff of the formula [O2N-phenyl(NO2,CN)-N=N-phenyl(OCH3,CH3O)-N(C2H5)2] | 1/1 SDS 0.18% | 2/1 SDS 0.37% |

The dyebath exhaustion or, in other words the residual dyestuff content in the dyebath at equilibrium, is significantly better when using the dyestuff mixtures or mix-crystals according to the invention than if, for example, Disperse Blue 56 used. Dyeing polyester fibers in 2/1 standard depth of shade at the boil in the customary presence of carrier results in the following dyebath exhaustions:

| | Exhaustion |
|---|---|
| Dyestuff of the formula (C.I. Disperse Blue 56) | 91% |
| Mixture* of 62 parts by weight of dyestuff of the formula [O2N-phenyl(CN,CN)-N=N-phenyl(CH3)-N(C2H5)2] and 38 parts by weight of dyestuff of the formula [O2N-phenyl(CN,CN)-N=N-phenyl(OCH3,CH3)-N(C2H5)2] (*in the form of a mix-crystal) | 97% |
| Mixture of 55 parts by weight of dyestuff of the formula [O2N-phenyl(CN,CN)-N=N-phenyl(CH3)-N(C2H5)2] and 35 parts by weight of dyestuff of the formula [O2N-phenyl(CN,CN)-N=N-phenyl(OCH3,CH3)-N(C2H5)2] and 10 parts by weight of dyestuff of the formula [O2N-phenyl(NO2,Cl)-N=N-phenyl(OCH3,CH3O)-N(C2H5)2] | 98% |

It is a particularly surprising feature of the dyestuff mixtures or mix-crystals according to the invention that their dyebath exhaustion is much better than that of the individual dyestuffs in question. As the following survey shows, dyeing polyester fibers at the boil (90 minutes at 98° to 100° C.) in association with the customary addition of carrier with the starting levels (bath concentration) of the individual dyestuffs or mixtures given hereinafter in percent by weight (expressed as pure dyestuff) on weight of fiber leads to the following dyebath exhaustions:

| | Starting Level | Exhaustion |
|---|---|---|
| Dyestuff of the formula | | |

-continued

| | Starting Level | Exhaustion |
|---|---|---|
| O₂N—⟨CN/CN⟩—N=N—⟨CH₃⟩—N(C₂H₅)₂ | 0.2% | 83.3% |
| | 0.4% | 74.9% |
| | 0.6% | 49.5% |

Dyestuff of the formula

O₂N—⟨CN/CN⟩—N=N—⟨OCH₃/CH₃⟩—N(C₂H₅)₂

| | 0.2% | 72.0% |
|---|---|---|
| | 0.4% | 58.5 |
| | 0.6% | 34.1% |

Dyestuff of the formula

O₂N—⟨NO₂/Cl⟩—N=N—⟨OCH₃/CH₃O⟩—N(C₂H₅)₂

| | 0.2% | 69.7% |
|---|---|---|
| | 0.4% | 54.2% |
| | 0.6% | 32.5% |

Mixture* of 62 parts by weight of dyestuff of the formula

O₂N—⟨CN/CN⟩—N=N—⟨CH₃⟩—N(C₂H₅)₂

| | 0.2% | 98.6% |
|---|---|---|
| | 0.4% | 95.8% |
| | 0.6% | 78.7% | and 38 parts by weight of dyestuff of the formula

O₂N—⟨CN/CN⟩—N=N—⟨OCH₃/CH₃⟩—N(C₂H₅)₂

Mixture of 55 parts by weight of dyestuff of the formula

O₂N—⟨CN/CN⟩—N=N—⟨CH₃⟩—N(C₂H₅)₂

| | 0.2% | 99.0% |
|---|---|---|
| | 0.4% | 97.5% |
| | 0.6% | 85.8% | and 35 parts by weight of dyestuff of the formula

O₂N—⟨CN/CN⟩—N=N—⟨OCH₃/CH₃⟩—N(C₂H₅)₂ and 10 parts by weight of dyestuff of the formula

O₂N—⟨NO₂/Cl⟩—N=N—⟨OCH₃/CH₃O⟩—N(C₂H₅)₂

(*in the form of a mix-crystal)

Furthermore, if the dyestuff mixtures or mix-crystals according to the invention are used for dyeing fiber mixtures at the boil in the presence of customary carriers, the wool, cotton or regenerated cellulose fiber components are significantly less stained than with Disperse Blue 56. Furthermore, the slight staining can be completely removed again by means of a customary reductive aftertreatment (for example sodium dithionite/sodium hydroxide solution, sodium dithionite/ammonia) of the dyeing with the dyestuff mixtures or mix-crystals according to the invention.

The dyestuff mixtures or mix-crystals according to the invention are not sensitive to calcium, magnesium, copper or iron ions in the sense of possible dyestuff precipitation.

If the dyestuff mixtures or mix-crystals according to the invention are used, this leads, in short dyeing times even if the dyeing conditions are unfavorable machine-wise or substratewise, to dyeings which are significantly more level than dyeings with, for example, Disperse Blue 56. This fact is particularly important in the dyeing of wound packages.

The dyestuff mixtures or mix-crystals according to the invention are advantageously put together in relation to the ingredient individual components in such a way that a dyestuff which, for example, shows a red shift in incandescent lamp light is combined with a dyestuff which, for example, shows a green shift in incandescent lamp light. In this way the appearance of the shade in artificial light can be set in a controlled manner with different dyes in the mixture.

For instance, by mixing on the abovementioned basis it is possible to come very close to the appearance of Disperse Blue 56 in artificial light, although, if anything, the result is slightly more advantageous.

If, for an experimental investigation of this state of affairs, the dyestuffs listed hereinafter are dyed up on polyester fibers at the boil in the presence of a customary carrier both individually and as mixtures, the appearance of the shade in artificial light can be monitored by measurement and be compared with the dyestuff most established in practice for dyeing polyester fibers at the boil, namely Disperse Blue 56. The colorimetric analysis is carried out in accordance with DIN 6,174 (colorimetric determination of differences in surface colors by the CIELAB formula) (cf. Table V):

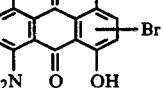

(C.I. Disperse Blue 56)    (a) 33% pure dyestuff in finished form

Dyestuff of the formula

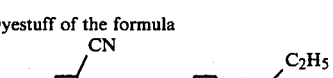

(b) 40% pure dyestuff in finished form

Dyestuff of the formula

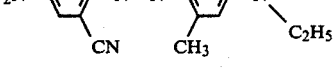

(c) 40% pure dyestuff in finished form

TABLE V

Difference between illuminant A (10° observer) = incandescent lamp light compared with illuminant D 65 (10° observer) = artificial daylight TABLE V-continued

| (a) | (b) | L* | A* | B* | E* | (c) | L* | A* | B* | E* | (b) + (c) | L* | A* | B* | E* |
|---|---|---|---|---|---|---|---|---|---|---|---|---|---|---|---|
| 0.05% | 0.01% | −0.16 | 1.14 | −0.68 | 1.04 | 0.01% | 0.09 | −0.65 | 1.19 | 1.05 | 0.006% + 0.004% | −0.24 | 0.24 | −0.29 | 0.50 |
| 0.1% | 0.02% | | | | 1.25 | 0.02% | | | | 1.39 | 0.012% + 0.008% | | | | 0.77 |
| 0.2% | 0.05% | | | | 1.34 | 0.05% | | | | 1.36 | 0.03% + 0.02% | | | | 0.46 |
| 0.5% | 0.1% | | | | 1.20 | 0.1% | | | | 2.21 | 0.06% + 0.04% | | | | 0.45 |
| 1% | 0.2% | | | | 1.82 | 0.2% | | | | 2.35 | 0.12% + 0.08% | | | | 0.68 |
| 2% | 0.5% | | | | 2.76 | 0.5% | | | | 2.47 | 0.3% + 0.2% | | | | 0.85 |
| 5% | 1% | | | | 4.05 | 1% | | | | 3.61 | 0.6% + 0.4% | | | | 0.90 |
| 10% | 2% | | | | 5.98 | 2% | | | | 4.52 | 1.2% + 0.8% | | | | 1.05 |

| | | Difference between illuminant F (10° observer) = fluorescent tube light compared with illuminant D 65 (10° observer) = artificial daylight | | | | |
|---|---|---|---|---|---|---|
| (a) | (b) | E* | (c) | E* | (b) + (c) | E* |
| 0.05% | 0.01% | 1.85 | 0.01% | 1.52 | 0.006% + 0.004% | 0.62 |
| 0.1% | 0.02% | 2.05 | 0.02% | 1.93 | 0.012% + 0.008% | 0.84 |
| 0.2% | 0.05% | 2.91 | 0.05% | 1.68 | 0.03% + 0.02% | 1.01 |
| 0.5% | 0.1% | 2.34 | 0.1% | 2.06 | 0.06% + 0.04% | 0.93 |
| 1% | 0.2% | 2.19 | 0.2% | 1.82 | 0.12% + 0.08% | 0.88 |
| 2% | 0.5% | 2.05 | 0.5% | 1.86 | 0.3% + 0.2% | 0.98 |
| 5% | 1% | 1.93 | 1% | 1.96 | 0.6% + 0.4% | 0.99 |
| 10% | 2% | 2.39 | 2% | 2.64 | 1.2% + 0.8% | 0.92 |

In the table
+ΔL* = lighter than Disperse Blue 56
−ΔL* = darker
+ΔA* = redder
−ΔA* = greener
+ΔB* = yellower
−ΔB* = bluer It is thus found that the dyestuff mixture under test only has a small metamerism index ΔE* compared with Disperse Blue 56. In practice a ΔE* value less than 1 is tolerated as an acceptable non-metameric match.

In the following examples, parts and percentages are by weight, unless otherwise stated.

EXAMPLE 1

432 g of copper(I) cyanide and 48 g of sodium cyanide were introduced into a 10-liter stirred flask containing 6 liters of dimethylformamide. After prior stirring at 25°-30° C. for 15 minutes, this mixture had added to it first of all 470 g of a dyestuff obtained by diazotizing 2,6-dibromo-4-nitroaniline in concentrated sulfuric acid and coupling with 3-(N,N-diethylamino)-toluene and then once more 500 g of a dyestuff prepared by diazotizing 2,6-dibromo-4-nitroaniline in concentrated sulfuric acid and coupling with 3-(N,N-diethylamino)-4-methoxytoluene. This mixture of azo dyestuffs was then stirred at 110° C. for 6 hours, was allowed to cool down, and was finally left to stand overnight at room temperature with further stirring. 2 liters of ice-water were then added at 15°-20° C. to the treatment medium in the course of an hour. The content of the flask was afterwards stirred for a further hour, and the precipitated product of the process was subsequently filtered off and washed with water. To remover copper salts, the resulting conversion product was stirred with a liquid phase of 5% strength ammonia and a wetting agent in the presence of air for a period of 4 hours and was then filtered again, and the filter residue was washed and subsequently dried at 40° C. in vacuo. The result was 665 g of a dyestuff preparation in the form of a mix-crystal in which the underlying individual components were disperse dyestuffs of the following formulae:

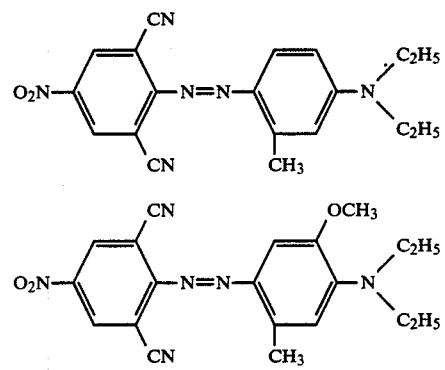

This mix-crystal was characterized in an X-ray diffraction spectrum by the relative reflex intensities 21.3/11.0/100.0/10.2/17.5/31.2 at the glancing angles θ (CuKα radiation) 6.25°/9.74°/11.46°/21.81°/24.38° 26.19°.

The formation of mix-crystals was also discernible to the naked eye from the runoff of the water-diluted dyestuff preparations.

40 parts of the dyestuff mix-crystal thus produced and 60 parts of a conventional dispersant of the lignin-sulfonate type were bead-milled in the presence of water into a fine dyestuff dispersion, which was then dried by spray-drying.

The textile material used in the subsequent dyeing at the boil was 100 parts of a PES fiber (of the polyethylene terephthalate type) in yarn form, which was placed in a dyeing beaker containing 2000 parts of water at 60° C., 2 parts of crystalline sodium acetate, 3 parts of 30% strength acetic acid and 5 parts of a commercially available carrier based on diphenyl, and 1 part of the dyestuff dispersion described above. This liquor plus the goods contained therein was then heated to 100° C. in the course of 30 minutes and was left at the set temperature for a treatment period of 60 minutes. The dyebath was then cooled down; the yarn thus dyed was first rinsed with water, was then dried and was finally dry-heated at 150° C. for 30 seconds.

The result of the dyeing was a bright, deep blue dye of high light fastness, while merely a hardly noticeable residual dyestuff content remained behind in the exhausted dyebath.

EXAMPLE 1a 100 parts of a textile material made of a PA fiber (of the nylon 6 type) were introduced into a dyeing beaker which contained 3000 parts of water at 40° C., 2 parts of crystalline acetate, 3 parts of 30% strength acetic acid and 0.5 part of the dyestuff preparation of Example 1. The dye liquor thus prepared was then heated to 98°–100° C. in the course of 45 minutes with agitation of the fiber material and was left at said temperature for 60 minutes. Afterwards the bath was cooled down; the goods thus treated were first rinsed with water and then dried. The result was a bright blue dyeing have good wet fastness properties.

EXAMPLE 1b

The PA fiber used in Example 1a as the textile material to be dyed was replaced by a mixture of equal parts of a CA fiber (secondary cellulose) and a CT fiber (cellulose triacetate). The dyeing itself was carried out as described in Example 1a. The result in this case was a bright blue dyeing having a slight marl effect in which the CA fiber had been dyed slightly deeper than the CT fiber.

EXAMPLE 2

Example 1 was repeated, except that a mixture (of the individual dyestuffs without mix-crystal formation) of 60 parts of the disperse dyestuff of the formula

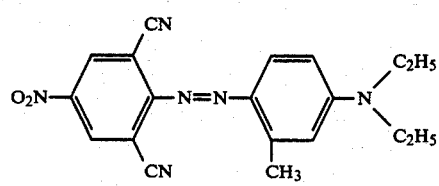

and 40 parts of the disperse dyestuff of the formula

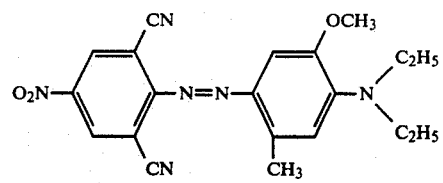

and 150 parts of a customary dispersant from the series of sulfonated naphthalene-formaldehyde condensation products was used, affording by aqueous bead-milling a fine dyestuff dispersion, which was then dried by spray-drying.

In the previously mentioned mixture, the first dyestuff was characterized in an X-ray diffraction spectrum by the relative reflex intensities 100.0/40.7/24.3/33.9/28.0/80.9/21.5 at the glancing angles $\theta$ (CuK$\alpha$ radiation) 7.0°/8.16°/10.00°/11.41°/16.30°/18.87°/25.94°/28.23°/30.45°.

The second dyestuff was characterized in an X-ray diffraction spectrum by the relative reflex intensities 100.0/60.5/43.6/46.4/44.4/23.1/21.9 at the glancing angles $\theta$ (CuK$\alpha$, radiation) 9.39°/10.49°/12.61°/13.01°/23.39°/24.40°/27.68°.

If the dyestuff dispersion thus prepared was then used to dye PES fibers at the boil as described in Example 1, the resulting dyeing and exhaustion of the dyebath were equivalent to the dyeing result obtained there.

EXAMPLE 3

The dyestuff dispersions prepared as described in Examples 1 and 2 were each used to carry out a demonstrative exhaust dyeing under high-temperature conditions without the use of a carrier as follows:

100 parts of a PES fiber (of the polyethylene terephthalate type) were introduced as piece goods into a dyeing autoclave which contained 1000 parts of water at 60° C., 2 parts of crystalline sodium acetate, 3 parts of 30% strength acetic acid and 2 parts of one of the abovementioned dyestuff dispersions of differing origin. This liquor was then heated to 130° C. in the course of 30 minutes and was then left at said temperature for 15 minutes. Cooling down the bath, rinsing the textile material thus treated with water and an aqueous reduction clear thereof at 80° C. with sodium dithionite/-sodium hydroxide solution produced a deep blue dyeing without noticeable dyestuff residues in the dyebath.

EXAMPLE 4

The example 1 exhaust-dyeing at the boil was repeated, except that the 100 parts of PES fiber used there as the textile material to be dyed were replaced by an intimate mixture of 50 parts of PES fiber and 50 parts of cotton or regenerated cellulose fiber in yarn form, affording in this case a deep blue dyeing on the PES fiber portion of the goods while the cotton or regenerated cellulose fiber component was only slightly stained.

On aftertreatment of the blend fiber material thus dyed at 80° C. with an aqueous liquor which contained a customary amount of sodium dithionite and sodium hydroxide solution for 15 minutes, the cotton or regenerated cellulose fiber portion became completely colorless.

EXAMPLE 5

The example 1 exhaust dyeing at the boil was repeated, except that the 10 parts of PES fiber used there as the textile material in yarn form to be dyed at the boil was replaced by an intimate mixture of 55 parts of PES fiber and 45 parts of wool, affording on the PES portion of the goods a deep blue dyeing, while the wool fiber component was only slightly stained.

On aftertreating the dyed PES fiber/wool mixture at 70°–80° C. for 15 minutes with an aqueous liquor containing a customary amount of sodium dithionite and ammonia, the wool portion became completely colorless.

EXAMPLE 6

On replacing the 100 parts of PES fiber of the polyethylene terephthalate type mentioned as the textile material in Example 1 by a customary PES fiber of any other type, for example based on polycyclohexylene terephthalate, and otherwise carrying out the dyeing as described in Example 1, this leads to a similar dyeing result.

EXAMPLE 7

If the dyeing technique described in Example 1 was carried out on the PES fiber wound package (a muff having a winding density of 300 g/l) by employing a one-directional liquor circulation from in to out and a dyeing liquor flow rate of 10 $l.kg^{-1}.min^{-1}$, a rate of heating at between 60° and 130° C. of $2°.min^{-1}$, and a dyeing time at 130° C. of 15 minutes, the result was a completely level dyeing.

EXAMPLE 8

To dye 100 parts of a textile material in piece form which contained PES fiber on a jet dyeing machine the liquor contained 1000 parts of water at 60° C., 2 parts of crystallized sodium acetate, 3 parts of 30% strength acetic acid, 4 parts of a commercially available carrier based on o-phenylphenol, 0.5 part of a commercially available yellow dyestuff of the type Disperse Yellow 54 (C.I. No. 47,020), 0.2 part of a commercially available red dyestuff of the type Disperse Red 65 (C.I. No. 11,228) and 0.1 part of a dyestuff dispersion prepared by aqueous bead-milling of 30 parts of a nonylphenol oxyethylate (with 25 moles of converted ethylene oxide), 40 parts of a commercially available dispersant based on ligninsulfonate and a mixture of 15 parts of the disperse dyestuff of the formula

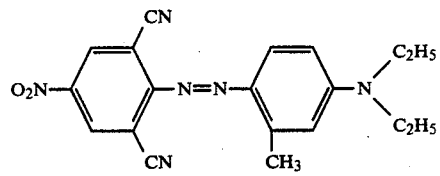

9 parts of the disperse dyestuff of the formula

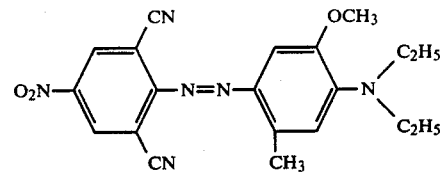

and 6 parts of the disperse dyestuff of the formula

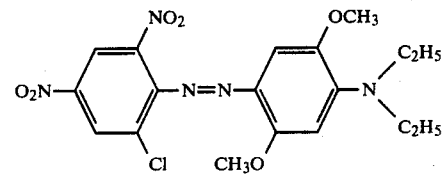

and by subsequently spray-drying the resulting dispersion.

To carry out the dyeing operation, the above dyeing liquor was heated to 98°–100° C. in the course of 30 minutes and the textile material was dyed at said temperature for 90 minutes. Afterwards, the dyeing jet was cooled down to 70° C. and the goods thus dyed were rinsed with water while continuing to circulate. The result on finishing was a brown dyeing having very good fastness properties and satisfactory levelness.

EXAMPLES 9 TO 24

Finely divided dyestuff dispersions (mixtures without mix-crystal formation) were prepared analogously to Example 2 from the dyestuffs of the formulae I and II

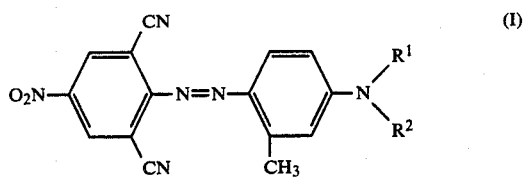

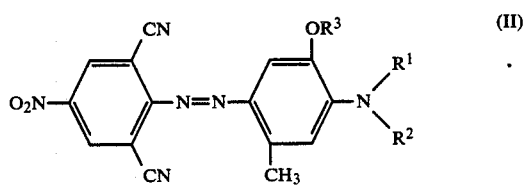

given in the following Table (a), in the amounts listed below, and on using these preparations in subsequent dyeing under the conditions mentioned there equally good dyeing results were obtained:

TABLE (a)

| Example | Parts of I | Parts of II | Dyestuff of the formula I | | Dyestuff of the formula II | | |
|---|---|---|---|---|---|---|---|
| | | | $R^1$ | $R^2$ | $R^1$ | $R^2$ | $R^3$ |
| 9 | 50 | 50 | —CH$_3$ | —CH$_3$ | —CH$_3$ | —CH$_3$ | —CH$_3$ |
| 10 | 20 | 80 | —CH$_3$ | —CH$_3$ | —CH$_3$ | —CH$_3$ | —CH$_3$ |
| 11 | 90 | 10 | —CH$_3$ | —CH$_3$ | —CH$_3$ | —CH$_3$ | —CH$_3$ |
| 12 | 50 | 50 | —C$_2$H$_5$ | —C$_2$H$_5$ | —CH$_3$ | —CH$_3$ | —CH$_3$ |
| 13 | 50 | 50 | —CH$_3$ | —C$_2$H$_5$ | —CH$_3$ | —CH$_3$ | —CH$_3$ |

TABLE (a)-continued

| Example | Parts of I | Parts of II | Dyestuff of the formula I R$^1$ | R$^2$ | Dyestuff of the formula II R$^1$ | R$^2$ | R$^3$ |
|---|---|---|---|---|---|---|---|
| 14 | 50 | 50 | —CH$_3$ | —CH(CH$_3$)$_2$ | —CH$_3$ | —CH$_3$ | —CH$_3$ |
| 15 | 50 | 50 | —CH$_3$ | —CH$_2$—CH=CH$_2$ | —CH$_3$ | —CH$_3$ | —CH$_3$ |
| 16 | 70 | 30 | —CH$_2$—CH=CH$_2$ | —CH$_2$—CH=CH$_2$ | —CH$_3$ | —CH$_3$ | —CH$_3$ |
| 17 | 70 | 30 | —CH$_3$ | —CH$_3$ | —C$_2$H$_5$ | —C$_2$H$_5$ | —CH$_3$ |
| 18 | 70 | 30 | —C$_2$H$_5$ | —C$_2$H$_5$ | —CH$_3$ | —C$_2$H$_5$ | —CH$_3$ |
| 19 | 70 | 30 | —C$_2$H$_5$ | —C$_2$H$_5$ | —CH$_3$ | —CH$_2$—CH=CH$_2$ | —CH$_3$ |
| 20 | 70 | 30 | —C$_2$H$_5$ | —C$_2$H$_5$ | —C$_2$H$_5$ | —(CH$_2$)$_3$—CH$_3$ | —CH$_3$ |
| 21 | 70 | 30 | —C$_2$H$_5$ | —C$_2$H$_5$ | —CH$_2$—CH=CH$_2$ | —CH$_2$—CH=CH$_2$ | —CH$_3$ |
| 22 | 70 | 30 | —C$_2$H$_5$ | —C$_2$H$_5$ | —CH$_3$ | —CH$_3$ | —C$_2$H$_5$ |
| 23 | 70 | 30 | —CH$_2$—CH=CH$_2$ | —CH$_2$—CH=CH$_2$ | —CH$_2$—CH=CH$_2$ | —CH$_2$—CH=CH$_2$ | —CH$_3$ |
| 24 | 60 | 40 | —CH$_2$—CH=CH$_2$ | —CH$_2$—CH=CH$_2$ | —CH$_2$—CH=CH$_2$ | —CH$_2$—CH=CH$_2$ | —CH$_2$—CH$_2$—O—CH$_3$ |

EXAMPLES 25 TO 27

On replacing in the preparation described in Example 2 the total of 20 parts of the individual dyestuffs of the formulae I and/or II used there by 20 parts of the dyestuffs of the formulae III or IV mentioned in the following Table (b) and dyeing in accordance with the method given in Example 2, equally good dyeing results were obtained:

TABLE (b)

| Example | Dyestuff of the formula III of formula IV |
|---|---|
| 25 | [structure: O$_2$N—(NO$_2$, Cl)—C$_6$H$_2$—N=N—C$_6$H$_3$(CH$_3$)—N(C$_2$H$_5$)(C$_2$H$_5$)] |
| 26 | [structure: O$_2$N—(NO$_2$, Br)—C$_6$H$_2$—N=N—C$_6$H$_2$(OCH$_3$, CH$_3$)—N(CH$_3$)(CH$_2$—CH=CH$_2$)] |
| 27 | [structure: O$_2$N—(NO$_2$, Cl)—C$_6$H$_2$—N=N—C$_6$H$_2$(OCH$_3$, CH$_3$O)—N(CH$_3$)(CH$_2$—C(CH$_3$)=CH$_2$)] |

What is claimed is:

1. A dyestuff preparation in the form of a mixture of mixed crystal for exhaust dyeing synthetic fiber material, which preparation consists of (a) 20 to 90 parts by weight of at least one blue disperse dyestuff of the formula I

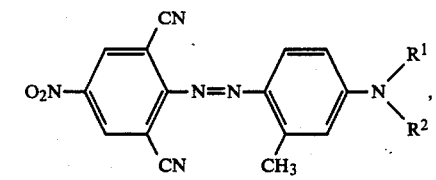

(I)

and 10 to 80 parts by weight of at least one blue disperse dyestuff of the formula II

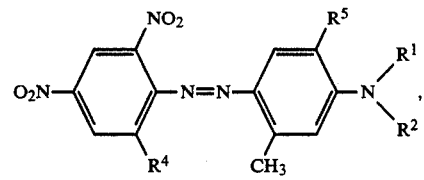

(II)

and 0 to 70 parts by weight of at least one disperse blue dyestuff of the formula III

[structure III: O$_2$N—(NO$_2$, R$^4$)—C$_6$H$_2$—N=N—C$_6$H$_2$(R$^5$, CH$_3$)—N(R$^1$)(R$^2$)]

(III)

and 0 to 30 parts by weight of at least one blue disperse dyestuff of the formula IV

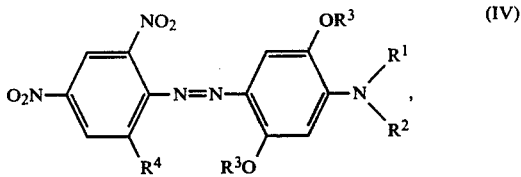

or (b) 20 to 90 parts by weight of at least one blue disperse dyestuff of the formula I,
and 10 to 80 parts by weight of at least one blue disperse dyestuff of the formula III,
and 0 to 30 parts by weight of at least one blue disperse dyestuff of the formula IV,
or (c) 10 to 80 parts by weight of at least one blue disperse dyestuff of the formula II, and 20 to 90 parts by weight of at least one blue disperse dyestuff of the formula III, and 0 to 30 parts by weight of at least one blue disperse dyestuff of the formula IV wherein the formulae I to IV
$R^1$ and $R^2$ = straight-chain or branched ($C_1$-$C_4$)-alkyl or ($C_2$-$C_4$)-alkenyl which can be each be identical or different,
$R^3$ = methyl or ethyl which can be interrupted in the carbon chain by ether oxygen,
$R^4$ = chlorine or bromine and
$R^5$ = hydrogen or radical $OR^3$
and in which the ingredient amounts of the respective individual dyestuffs I to IV, together result in 100 parts by weight of the total dyestuff preparation.

2. A dyestuff preparation as claimed in claim 1 which consists of (a) 30 to 80 parts by weight of at least one blue disperse dyestuff of the formula I,
and 20 to 70 parts by weight of at least one blue disperse dyestuff of the formula II,
and 0 to 50 parts by weight of at least one blue disperse dyestuff of the formula III,
and 0 to 20 parts by weight of at least one blue disperse dyestuff of the formula IV,
or (b) 30 to 80 parts by weight of at least one blue disperse dyestuff of the formula I,
and 20 to 70 parts by weight of at least one blue disperse dyestuff of the formula III, and 0 to 20 parts by weight of at least one blue disperse dyestuff of the formula IV,
or (c) 20 to 70 parts by weight of at least one blue disperse dyestuff of the formula II, and 30 to 80 parts by weight of at least one blue disperse dyestuff of the formula III, and 0 to 20 parts by weight of at least one blue disperse dyestuff of the formula IV and in which the ingredient amounts of the respective individual dyestuffs I to IV, together result in 100 parts by weight of the total dyestuff preparation.

3. A dyestuff preparation as claimed in claim 1 which contains 50 to 70 parts by weight of a blue disperse dyestuff of the formula I in which $R^1$ and $R^2 = C_2H_5$ and 30 to 50 parts by weight of a blue disperse dyestuff of the formula II in which $R^1$ and $R^2 = C_2H_5$, and $R^3 = CH_3$ and in which the ingredient amounts of the respective individual dyestuffs I to IV, together result in 100 parts by weight of the total dyestuff preparation.

4. A dyestuff preparation as claimed in claim 1 which contains 50 to 70 parts by weight of a blue disperse dyestuff of the formula I in which $R^1$ and $R^2 = C_2H_5$ and 30 to 50 parts by weight of a blue disperse dyestuff of the formula II in which $R^1$ and $R^2 = C_2H_5$ and $R^3 = CH_3$ and 0 to 20 parts by weight of a blue disperse dyestuff of the formula IV in which $R^1$ and $R^2 = C_2H_5$, $R^3 = CH_3$ and $R^4 =$ chlorine or bromine and in which the ingredient amounts of the respective individual dyestuffs I to IV, together result in 100 parts by weight of the total dyestuff preparation.

5. A dyestuff preparation as claimed in claim 1 which contains in addition at least one further disperse dyestuff which has a chemical structure other than that of the dyestuffs of the formulae I to IV and which likewise produces a blue shade by itself and in which the ingredient amounts of the respective individual dyestuffs I to IV, together result in 100 parts by weight of the total dyestuff preparation.

6. A dyestuff preparation as claimed in claim 1 which contains in addition at least one further disperse dyestuff which has a chemical structure other than that of the dyestuff of the formulae I to IV and which by itself produces a shade other than blue and in which the ingredient amounts of the respective individual dyestuffs I to IV, together result in 100 parts by weight of the total dyestuff preparation.

7. A dyestuff preparation as claimed in claim 1 wherein the mixture or mixed-crystal of the disperse dyestuffs of the formulae I to IV with or without at least one further dyestuff mixing component as claimed in claims 5 or 6 is present in the state of a fine dispersion resulting from grinding with dispersant(s).

8. A dyestuff preparation as claimed in claim 7 of the disperse dyestuffs of the formulae I to IV which has been prepared by
mixing completely prepared dyestuff preparations of the respective individual dyestuffs or
completing the steps of preparation of the respective individual dyestuffs in form of mixture, or
completing the steps of preparation of the respective individual dyestuffs in the form of a mixture, under conditions where the formation of a mixed crystal of the individual components occurs, or
completing the steps of preparation of a mixed crystal of the respective individual dyestuffs which is obtained by azo coupling or cyano exchange,
with or without at least a further component of the dyestuff mixture as claimed in claims 5 or 6.

9. A process for exhaust dyeing textile material consisting of synthetic fibers or containing these synthetic fibers as component of a fiber blend with natural or regenerated fibers,
with a disperse blue dyestuff for self-shade or combination-shade dyeings, which comprises using a dyestuff preparation in the form of a mixture or mixed crystals
said preparation which consists of (a) 20 to 90 parts by weight of at least one blue disperse dyestuff or the formula I

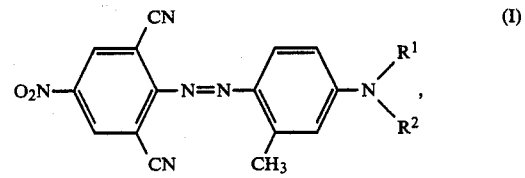

and 10 to 80 parts by weight of at least one blue disperse dyestuff of the formula II

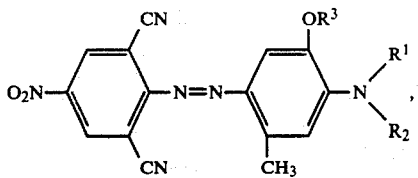

(II)

and 0 to 70 parts by weight of at least one disperse blue dyestuff of the formula III

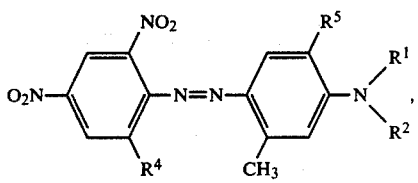

(III)

and 0 to 30 parts by weight of at least one blue disperse dyestuff of the formula IV

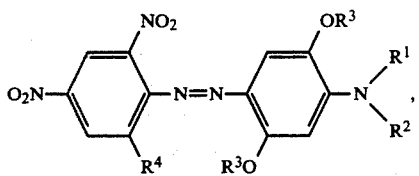

(IV)

or (b) 20 to 90 parts by weight of at least one blue disperse dyestuff of the formula I,
and 10 to 80 parts by weight of at least one blue disperse dyestuff of the formula III,
and 0 to 30 parts by weight of at least one blue disperse dyestuff of the formula IV,
or (c) 10 to 80 parts by weight of at least one blue disperse dyestuff of the formula III and 20 to 90 parts by weight of at least one blue disperse dyestuff of the formula ii, and 0 to 30 parts by weight of at least one blue disperse dyestuff of the formula IV
where in the formulae I to IV $R^1$ and $R^2$ = straight-chain or branched ($C_1$–$C_4$)-alkyl or ($C_2$–$C_4$)-alkenyl which can each be identical or different,
$R^3$ = methyl or ethyl which can be interrupted in the carbon chain by ether oxygen,
$R^4$ = chlorine or bromine and
$R^5$ = hydrogen or radical $OR^3$
and in which the ingredient amounts of the respective individual dyestuffs I to IV together result in 100 parts by weight of the total dyestuff preparation.

10. The process as claimed in claim 9 wherein the synthetic fiber material comprises polyester, nylon or acetate fibers.

11. The process as claimed in claim 9 wherein the polyester fiber material is a copolymer of an ester monomer modified with a polyethylene glycol, isophthalic acid or benzo-1-4-diphosphorous acid as an incorporated component.

12. The process as claimed in claim 9 wherein the dyeing operation is carried out as an exhaust-dyeing under high-temperature (HT) conditions.

13. The process as claimed in claim 9 wherein the dyeing operation is carried out as an exhaust-dyeing under atmospheric conditions at the boil of the aqueous dyeing medium in the absence or presence of a carrier.

14. The process as claimed in claim 7, wherein said dyestuff preparation is used for dyeing in combination with additionally at least one further disperse dyestuff which has a chemical structure other than that of the dyestuffs of the formulae I to IV and which likewise produces a blue shade by itself.

15. The process as claimed in claim 7, wherein said dyestuff preparation is used for dyeing in combination with additionally at least one further disperse dyestuff which has a chemical structure other than that of the dyestuffs of the formulae I to IV and which by itself produces a shade other than blue.

16. Textile material consisting of synthetic fibers or containing these synthetic fibers as component of a fiber blend which has been dyed with a dyestuff preparation as claimed in claim 1.

17. Textile material consisting of synthetic fibers or containing these synthetic fibers as component of a fiber blend which has been dyed using a process as claimed in claim 16.

* * * * *